United States Patent [19]

Burkin et al.

[11] 3,875,639

[45] Apr. 8, 1975

[54] APPARATUS FOR WIRING MEMORY MATRIX CORES

[76] Inventors: Jury Alexandrovich Burkin, Tsvetnoi proezd, 29, kv. 24; Jury Emelyanovich Seleznev, Vesenny proezd, 4a, kv. 16, both of Novosibirsk, U.S.S.R.

[22] Filed: Dec. 6, 1973

[21] Appl. No.: 422,138

[30] Foreign Application Priority Data

Dec. 7, 1972 U.S.S.R. .............................. 856407

[52] U.S. Cl. ....... 29/203 MM; 29/203 D; 29/240.5; 29/241; 29/433; 29/604; 140/92.3; 140/92.8

[51] Int. Cl. ........................................... H01f 41/02

[58] Field of Search .. 29/203 MM, 604, 241, 240.5, 29/433, 456, 203 D; 340/174 MA; 140/147, 92.3, 92.4, 92.7, 92.8

[56] References Cited

UNITED STATES PATENTS

| | | | |
|---|---|---|---|
| 3,282,304 | 11/1966 | Coleman | 140/147 |
| 3,310,865 | 3/1967 | Schelling | 29/604 |
| 3,584,362 | 6/1971 | Hazel et al. | 29/203 MM |

*Primary Examiner*—Carl E. Hall
*Attorney, Agent, or Firm*—Holman & Stern

[57] ABSTRACT

An apparatus for wiring memory matrix cores comprising a straightening member for straightening coiled wire. The member contains at least one roller connected to a drive which imparts reciprocating and rotary motion simultaneously thereto. Each roller is linked with a terminal member for one of the ends of the coiled wire so that at one revolution of the roller in a direction opposite to the wire coiling direction, the roller is simultaneously shifted a distance equal to the length of a straightened turn of the coiled wire.

4 Claims, 3 Drawing Figures

APPARATUS FOR WIRING MEMORY MATRIX CORES

BACKGROUND OF THE INVENTION

The invention relates broadly to equipment for manufacturing the memories of electronic computers, logic automata, magnetic-core communication, control and monitoring circuits, and more particularly to apparatus for wiring memory matrix cores.

The apparatus for wiring memory matrix cores according to the invention can be employed for manufacturing memory matrices with any arrangement of magnetic cores at the intersections of the X and Y drive wires in the memory matrix. This invention is applicable for mechanized threading of a coiled wire of practically unlimited length through magnetic cores of any size, including superminiature cores.

Devices for threading memory matrix cores are known in the art, for example, an apparatus for wiring memory matrix cores with the aid of a coiled wire.

This known device comprises a frame on which rows of Y drive wires strung through magnetic cores are fastened in slight tension. The Y drive wires are accommodated in equally spaced grooves of a roller located on the frame and intended for gripping one core at a time from the columns of cores and aligning the gripped separated cores in a threading area where they are threaded in the X direction by a coiled wire coming from a coiling member. The coiling member is located at the end of the roller and comprises a tapered spindle placed between dies and provided with a drive.

In matrix core wiring apparatus, memory matrices are threaded with a coiled wire as follows. The roller separates one magnetic core from each column of cores and the separated magnetic cores are aligned in a row in a threading area by rotation of the roller. The cores are fixed in the threading area by the tension of the Y drive wires on which they are strung. The wire coiling member coils the wire so that the pitch of the coil equals the space between the Y drive wires. The magnetic cores are then threaded by a coiled wire in the X direction. Core threading is effected by rotating this coil with simultaneous forward movement along the coil path. By further rotation of the roller, the coiled wire strung through magnetic cores is thrown off the roller. The coiled wire with strung magnetic cores is straightened manually by pulling its ends to form one string of a memory matrix.

The known apparatus for wiring memory matrices with a coiled wire has, however, a disadvantage in that no facilities are provided in the apparatus for straightening the coiled wire. This important operation is performed by hand, by simply pulling the ends of the coiled wire which thus renders the matrix manufacturing process dependent on a subjective element. Additionally, since the pulled ends of the coiled wire are held between the operator's fingers twists appear on the straightened wire, i.e., the straightened wire is twisted around its axis a number of times equal to the number of coiled wire turns that were straightened. All the above factors tend to lower the quality of the matrices and reduce threading efficiency.

SUMMARY OF THE INVENTION

It is an object of the present invention to provide a device for wiring memory matrix cores having means for mechanically straightening a coiled wire which enables manufacture of memory matrices having better characteristics independent of the operator's subjective qualities and thus raise threading efficiency.

With this and other objects in view, the invention resides in an apparatus for wiring memory matrix cores wherein magnetic cores strung on the Y-drive wires secured in rows on a frame are threaded in the X-direction by a coiled wire and which, according to the invention, has a straightening member for straightening the coiled wire. The straightening member comprising a roller connected to a drive which provides simultaneous reciprocating and rotary motion thereto; the roller is connected to a terminal member of one of the ends of the coiled wire while the other end of the wire is rigidly secured on the frame so that at each revolution of the roller in a direction opposite to the direction of wire coiling, the roller simultaneously moves forward a distance equal to the length of a straightened turn of the coiled wire.

Also according to the invention, the apparatus for wiring memory matrix cores in which magnetic cores strung on the Y-drive wires secured in rows on the frame are threaded in the X-direction by a coiled wire, has a straightening member for straightening the coiled wire comprising two rollers connected to a drive for imparting to them reciprocating motion with simultaneous rotation in opposite directions, each of the rollers being connected to a terminal member of one end of the coiled wire so that at each revolution of each roller in a direction opposite to the coiling direction each roller simultaneously moves forward a distance equal to the length of a straightened turn of the coiled wire.

It is preferable that the straightening member include a mechanism for successive feeding of the turns of the coiled wire to be straightened which is connected to the drive in such a way that one revolution of the roller in a direction opposite to the wire coiling direction with simultaneous forward movement of the roller through the length of a straightened turn of the coiled wire shifts the feeding mechanism off the end of the coiled wire at a distance equal to the coil pitch.

The apparatus according to the invention for wiring memory matrix cores automates the entire manufacturing process, improves the quality of the matrices, raises threading efficiency and can be used for wiring magnetic core matrices composed of cores of any size and with any arrangement of the magnetic cores in the memory matrix.

BRIEF DESCRIPTION OF THE DRAWINGS

Other objects and advantages of the present invention will become more readily apparent from the following description of exemplary embodiments thereof illustrated in the accompanying drawings wherein.

DETAILED DESCRIPTION OF PREFERRED EMBODIMENTS

Figure 1:
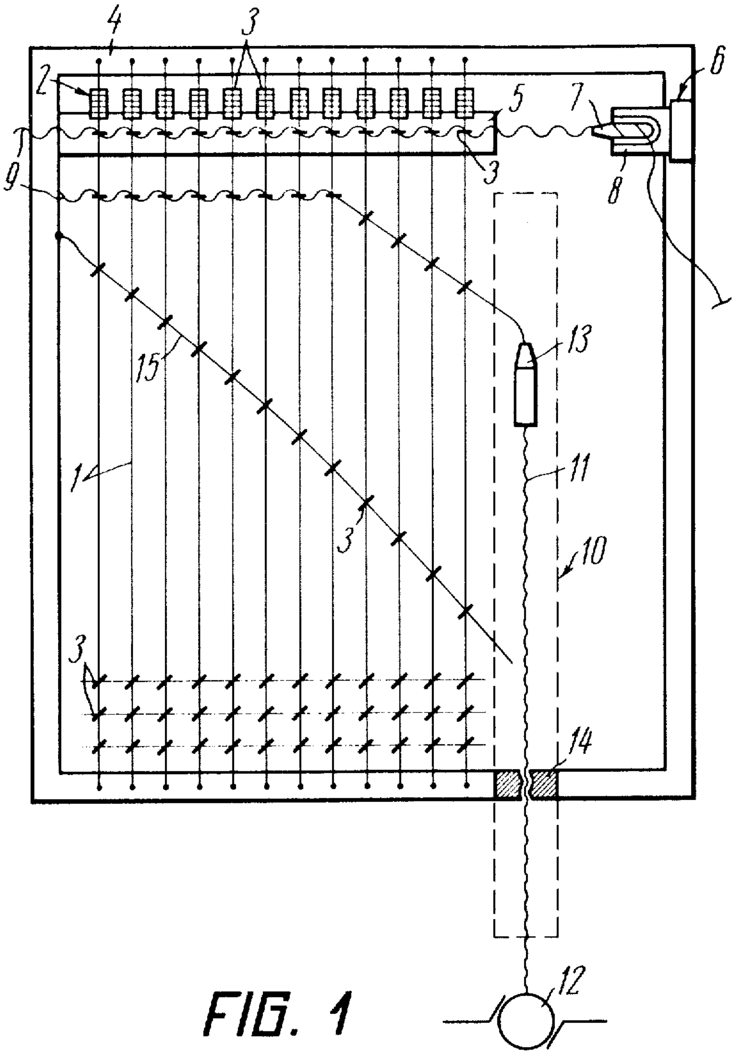
FIG. 1 illustrates schematically an embodiment of an apparatus for wiring memory matrix cores in which a straightening member for straightening the coiled wire comprises one roller, according to the invention.

The apparatus for wiring memory matrix cores according to the invention comprises Y drive wires 1 (FIG. 1) strung through columns 2 of magnetic cores 3, arranged in equally spaced rows and fastened on a frame 4 under slight tension, an aligning mechanism 5 for separating one magnetic core 3 at a time from each column 2 and aligning the separated cores in a row in the threading area, and a coiling member 6 in the form of a tapered spindle 7 placed in a housing 8. The coiling member 6 forms a coiled wire 9 which threads the magnetic cores 3 in the X direction.

Figure 2:
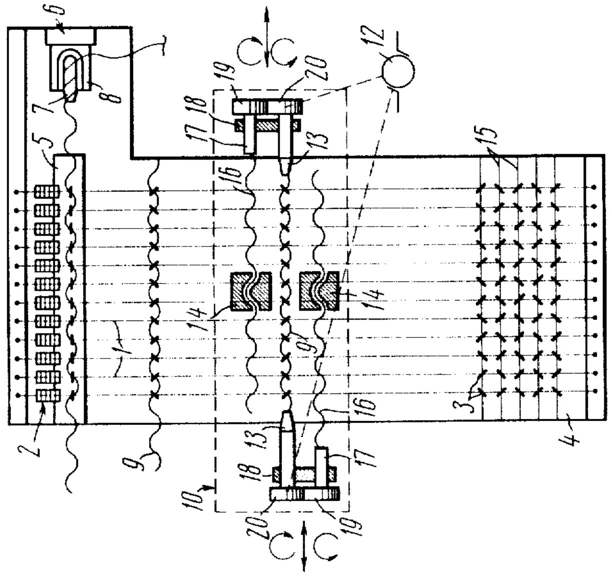
FIG. 2 illustrates schematically another embodiment of an apparatus for wiring memory matrix cores in which a straightening member comprises two rollers, according to the invnetion.

The apparatus for wiring memory matrix cores according to the invention has a straightening member 10 for straightening the coiled wire. The member 10 comprises, in the first embodiment of the invention, a roller 11 connected to a drive, for example, an electric motor 12, for imparting reciprocating and rotary motion thereto. At the end of the roller 11 there is a terminal member 13 for clamping one end of the coiled wire 9. The other end of the coiled wire 9 is rigidly fastened on the frame 4. Kinematic coupling of the roller 11 with the electric motor 12 is such that at each revolution of the roller 11 in a direction opposite to the wire coiling direction, it moves forward through a distance equal to a strainghtened turn of the coiled wire. This is ensured since the roller 11 is made as a screw having a pitch equal to the length of a straightened turn of the coiled wire which turns in a nut 14 secured to the frame 4. The direction of the helical lines of the roller 11 and the nut 14 must correspond to the coiling direction. The nut 14 is placed at a distance from the end of the coiled wire 9 fastened in the frame 4 which is sufficient for accommodating a straightened wire 15 between the end of the coiled wire 9 secured on the frame 4 and the nut 14. The roller 11 must be longer than the above distance. In another embodiment of the present invention, the straightening mechanism 10 for straightening the coiled wire comprises two rollers 16 (FIG. 2). Each of the rollers 16 is of screw form having a cylindrical end 17. The ends 17 of the rollers 16 pass through sleeves 18 and engage gears 19 which are meshed with gears 20. Each of the gears 20 is rigidly connected to a terminal member 13 to which is attached one of the ends of the coiled wire 9. The gears 19 and 20 couple the rollers 16 with the electric motor 12 which thereby imparts thereto reciprocating motion in opposite directions with simultaneous rotation also in opposite directions. Rotary motion is transmitted from the rollers 16 to the terminal members 13 either through the gears 19 and 20, as in the present embodiment of the invention, or through any other form of transmission mechanism. The rollers 16 rotate in the nuts 14 rigidly attached to the frame 4. The screw pitch of each roller 16 is adjusted to the length of a straightened turn of the coiled wire 9 by selecting an appropriate transmission ratio of the gears 19 and 20. The direction of the helical lines of the rollers 16 corresponds to the wire coiling direction with account of transmission through the gears 19 and 20. If the coiling direction is changeable, the gears 19 and 20 are fitted with a reversing switch (not shown).

Figure 3:
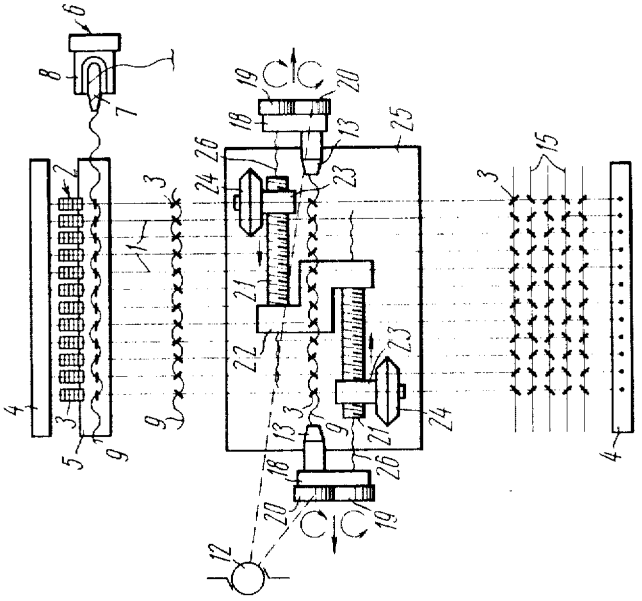
FIG. 3 is a schematic view of an apparatus for wiring memory matrix cores in which a straightening member includes a mechanism for successive feeding of the coiled wire turns to be straightened, according to the invention.

In both embodiments of the present invention, the straightening member 10 for straightening the coiled wire may include a feeding mechanism for successively feeding the coiled wire turns which are to be straightened. Here is considered the design of a feeding mechanism for a matrix threading apparatus whereinthe straightening member 10 is composed of two rollers. The feeding mechanism for successively feeding coiled wire turns to be straightened comprises two hollow feed screws 21 (FIG. 3) rotatable about their axes without moving along the axis which are contained inside a housing 22. A carriage 23 formed as a nut is fitted onto each hollow feed screw 21. The carriage 23 carries an elastic roll 24 with the axis of the latter being normal to the axis of the feed screw 21. Both rolls 24 are placed on one side of the Y drive wires 1 directly proximate to the wires, while on the other side of the Y-drive wires a replaceable plate 25 is mounted made, for example, of organic glass, which is also proximate to the wires 1. The inside of each hollow feed screw 21 accommodates a roller 26 of the wire straightening member. The roller 26 is geared to the hollow feed screw 21 in such a way that reciprocating motion of the roller 26 effected simultaneously with its rotation causes synchronized rotation of the hollow feed screw 21.

Constructionally, this is provided, for instance, by cutting a key slot (not shown) along the roller 26 which engages a key or a boss (not shown) on the wall of the inside of the hollow feed screw 21. If the helical line of the roller 26 is righthanded, the helical line of the hollow feed screw 21 must be lefthanded, and vice versa, so that the roller 26 and the carriage 23 move in the opposite directions. Normal operation of the straightening member comprising a successive wire feed mechanism requires that in case the elastic rolls 24 are positioned against the extreme Y-drive wires 1 the rollers 26 must be inserted inside the hollow feed screws 21 in such a way as to have each clamp 13 of one of the ends of the coiled wire 9 against a corresponding end of the coiled wire 9.

The successive feeding mechanism is designed similarly for an embodiment of the apparatus for wiring memory matrix cores in which the straightening member 10 for straightening the coiled wire comprises one roller.

The operating principle of the apparatus for wiring memory matrix cores wherein the wire straightening member 10 contains one roller is as follows.

Prior to beginning an operation, the magnetic cores 3 are strung on each Y-drive wire 1 (FIG. 1) in an amount sufficient for wiring the entire matrix or the memory module. The equally spaced Y-drive wires 1 are secured under slight tension in a row on the frame 4. The coiling member 6 is supplied with a wire for forming the coiled wire 9. Then, using the aligning mechanism 5, magnetic cores 3 are separated one by one from the columns of the cores and are aligned in a row in the threading area where they are fixed by the tension of the Y-drive wires 1 which press them to the mechanism 5. In this position, the aligned magnetic cores 3 are threaded in the X-direction by the coiled wire 9 coiled at a pitch equal to the space between the magnetic cores 3. Threading is effected by rotating the coil with simultaneous feeding thereof along the coil path. Then, the coiled wire 9 threaded through the magnetic cores 3 is thrown off the aligning mechanism 5 by cutting the coiled wire 9 off the coiling member 6. The coiled wire 9 is then delivered for straightening.

One of the ends of the coiled wire 9 is secured in the terminal member 13 disposed at the end of the roller 11. To do that, the roller 11 must be advanced from the nut 14 so that the clamp 13 is positioned against the end of the coiled wire 9. The other end of the coiled wire 9 is rigidly attached to the frame 4, and the electric motor 12 is turned on. The motor 12 causes the roller 11 to rotate in a direction opposite to the wire coiling direction, as a result of which the roller moves away thereby pulling the end of the coiled wire 9 secured in the terminal member 13.

Within one revolution of the roller 11 in a direction opposite to the coiling direction, the roller moves away a distance equal to the length of the straightened turn of the coiled wire. Straightening of the coiled wire 9 continues until the roller 11 with the terminal member 13 at its end moves over a distance equal to the length of the straightened wire 15. During this movement, the end of the coiled wire 9 clamped in the terminal member 13 revolves about its axis a number of times equal to the number of turns in the wire 9 which eliminates twisting of the straightened wire 15.

The straightened wire 15 threaded through the magnetic cores 3 is shifted along the Y drive wires 1 to its proper place in the matrix and is fixed in this position.

Further operation is performed similarly.

When the apparatus for wiring memory matrix cores employs the straightening member 10 with two rollers 16 (FIG. 2), the procedures employed for threading the coiled wire 9 through the magnetic cores 3 remain the same. The ends of the coiled wire 9 delivered for straightening, together with the magnetic cores 3 strung on it, are secured in the terminal member 13 connected to the rollers 16. Connection of the electric motor 12 causes rotation of the rollers 16, and each roller 16 starts rotating in a direction opposite to the wire coiling direction and moves away, pulling the end of the coiled wire 9 clamped in the terminal member 13 of this roller 16.

Within one revolution of each roller 16 in a direction opposite to the wire coiling direction, the roller at the same time moves away a distance equal to the length of a straightened turn of the coiled wire. Straightening of the coiled wire 9 is completed when each of the terminal members 13 is shifted through a distance equal to half the length of the straightened wire 15. The straightened wire 15 is then detached from the terminal members 13 and positioned in the matrix as required. The rollers 16 are returned to their initial position. Further operation for manufacturing the memory matrix is as described above.

This embodiment of the apparatus doubly reduces damage to the insulation of the straightened wire 15 brought about by catching on core edges in the course of straightening.

If the direction of coiling is changeable, prior to each connection of the drive in an appropriate position, it is necessary to reverse the gear transmission of the rollers 16 composed of the gears 19 and 20.

Let us consider now operation of the coil straightening member composed of two rollers and containing a mechanism for successive feeding of wire turns for straightening.

Prior to straightening the wire 9, the replaceable plate 25 (FIG. 3) is removed. One end of the coiled wire 9 is fixed in each terminal member 13 so that the elastic rolls 24 are positioned against the outside Y-drive wires 1. The replaceable plate 25 is then replaced and the electric motor 12 is turned on. The motor 12 drives the rollers 26. During one revolution of each roller 26 in a direction opposite to the wire coiling direction, with a simultaneous shift away by a distance equal to the length of the straightened turn of the coiled wire, the elastic rolls 24 move towards the middle of the coiled wire 9, each at a pitch of the coil, consequently, covering the distance equal to the space between the Y-drive wires 1. Thus, during each revolution of the rollers 26, each elastic roll 24 slides off the Y-drive wire 1 onto the next one closer to the middle of the coiled wire 9 and thereby delivers the coil turn between these wires for straightening. In this case the coiled wire 9 is straightened turn by turn, starting from the end turns. By the end of the straightening process, the elastic rolls 24 move to the central Y-drive wires 1 having completed delivery of all the turns of the coiled wire for straightening. After the coiled wire has been straightened, the rolls 24 displace the replaceable plate 25, release the ends of the straightened wire 15 from the terminal members 13 and set the wire in the memory matrix. The straightening member 10 is returned to its initial position.

The apparatus of the invention permits mechanization of the manual operation of straightening the coiled wire 9 in an apparatus for wiring memory matrix cores, raises threading efficiency and provides conditions for complete automation of the threading process. The apparatus further improves the quality of matrices due to complete elimination of wire twists around the axis in the memory matrix and making the threading operation independent of subjective factors. The apparatus is simple in manufacture and reliable in operation and thereby reduces the skill required by an operator of the apparatus.

We claim:

1. An apparatus for wiring memory cores comprising: a frame; means for securing a plurality of drive wires in rows on said frame in the Y-direction of the co-ordinate axis, coiling means secured to said frame for coiling wire and threading magnetic cores disposed on the Y-axis drive wires with the coiled wire in the X-direction of the co-ordinate axis; a straightening means for straightening said coiled wire and comprising a drive, a roller coupled to said drive which drive imparts to said roller reciprocating and rotary motion; a terminal member rigidly attached to one end of said coiled wire and to said roller, the other end of said coiled wire being rigidly fastened to said frame, so that at each revolution of said roller in a direction opposite to the wire coiling direction said roller moves forward through a length equal to the length of a straightened turn of said wire.

2. An apparatus for wiring memory matrix cores as set forth in claim 1, wherein said straightening means includes means for successively feeding individual wire turns of the coiled wire for straightening and coupled to said drive in such a way that at one revolution of said roller in a direction opposite to the wire coiling direction with simultaneous forward movement through a distance equal to the length of a straightened turn of said coiled wire, said means for successively feeding wire turns of said coiled wire for straightening is shifted off the end of said coiled wire by a distance equal to the pitch of said coiled wire.

3. An apparatus for wiring memory matrix cores, comprising: a frame; means for securing a plurality of drive wires in rows on said frame in the Y-direction of the co-ordinate axis; coiling means secured to said frame for coiling wire and threading magnetic cores disposed on the Y-axis drive wires with the coiled wire in the X-direction of the co-ordinate axis relative to said drive wires; a straightening means for straightening said coiled wire and comprising a drive, two rollers coupled to said drive which drive imparts thereto reciprocating motion with simultaneous rotation in opposite directions; a plurality of terminal members attached to one of the ends of said coiled wire, each said terminal member being also coupled to one of said rollers whereby at each revolution of said rollers in a direction opposite to the wire coiling direction each said roller moves forward through a distance equal to the length of a straightened turn of said rolled wire.

4. An apparatus for wiring memory matrix cores as set forth in claim 3, wherein said straightening means includes means for successively feeding individual wire turns of the coiled wire for straightening and coupled to said drive in such a way that at one revolution of said rollers in a direction opposite to the wire coiling direction with simultaneous forward movement through a distance equal to the length of a straightened turn of said coiled wire, said means for successively feeding wire turns of said coiled wire for straightening is shifted off the end of said coiled wire at a distance equal to the pitch of said coiled wire.

* * * * *